(12) United States Patent
Shemtov

(10) Patent No.: US 8,646,813 B1
(45) Date of Patent: Feb. 11, 2014

(54) ELECTRICAL CONDUIT CONNECTOR WITH TWO-POINT ENGAGEMENT

(76) Inventor: Sami Shemtov, Hollywood, FL (US)

( * ) Notice: Subject to any disclaimer, the term of this patent is extended or adjusted under 35 U.S.C. 154(b) by 760 days.

(21) Appl. No.: 12/756,610

(22) Filed: Apr. 8, 2010

(51) Int. Cl.
*F16L 19/00* (2006.01)

(52) U.S. Cl.
USPC .......... 285/404; 285/23; 285/89; 285/90; 285/903; 439/460; 174/60; 174/657

(58) Field of Classification Search
USPC .......... 285/404, 23, 89–91, 903; 439/460; 174/59–60, 650, 657
See application file for complete search history.

(56) References Cited

U.S. PATENT DOCUMENTS

| | | | | |
|---|---|---|---|---|
| 2,000,850 | A | * | 5/1935 | Knell .......................... 220/3.2 |
| 4,159,134 | A | | 6/1979 | Shemtov |
| 5,083,938 | A | * | 1/1992 | Poliak .......................... 439/460 |
| 5,460,532 | A | * | 10/1995 | Leto .............................. 439/100 |
| 6,793,404 | B2 | * | 9/2004 | Kraus et al. ..................... 385/81 |
| 7,126,064 | B1 | | 10/2006 | Shemtov |
| 7,476,817 | B1 | | 1/2009 | Shemtov |
| 7,495,184 | B1 | * | 2/2009 | Gretz ............................ 174/655 |

* cited by examiner

*Primary Examiner* — Aaron Dunwoody
*Assistant Examiner* — Fannie Kee
(74) *Attorney, Agent, or Firm* — Craig A. Fieschko, Esq.; DeWitt Ross & Stevens S.C.

(57) ABSTRACT

An exemplary connector assembly includes an elongated body with an internal passage for a conduit or cables. A body aperture region with a body fastener aperture is set between two elongated slots. The body aperture region may radially bulge out from the body, and may alternatively or additionally include an aperture flange protruding from the body aperture region. A U-shaped connector clip includes two parallel teeth that are inserted in the two slots, and a clip body having a clip fastener aperture. A fastener is inserted through the fastener apertures, securing the connector clip to the body. A fastening clip secures the fastener to the connector clip and keeps the connector clip from falling back into the slots as the connector clip is being disengaged from the body. Each clip tooth includes an engaging end that is complementarily interfittable with grooves in the conduit, keeping the conduit in place.

21 Claims, 2 Drawing Sheets

ELECTRICAL CONDUIT CONNECTOR WITH TWO-POINT ENGAGEMENT

FIELD OF THE INVENTION

This document concerns an invention relating generally to connector assemblies that house conduits and cables, such as electrical cables.

BACKGROUND OF THE INVENTION

Connector assemblies can be used to bring conduits and cables (such as electrical cables) together in various configurations. A cylindrical connector body may have a cable inserted through a first end, and have a threaded second end which can be inserted into, and attached within, a junction box. A conduit or cable within the connector body, however, may need to be held in place so that it does not move through the connector body. The devices used to hold the conduit or cable within the connector body often do not provide a good grasp, so the conduit or cable may not be held firmly in place. Also, these devices may take space within the connector body, space that would otherwise be available for the conduit or cable inserted through the connector body. The devices are additionally often not easy to use. What is needed is a versatile connector assembly that provides a convenient and effective way to interface with conduits and cables.

SUMMARY OF THE INVENTION

The invention, which is defined by the claims set forth at the end of this document, is directed to a connector assembly for housing conduits and cables which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIG. 1, an exemplary connector assembly 10 includes an elongated body 12 having an internal passage 20 through which a conduit 22 and/or a cable 24 are inserted. The body 12 interfaces with a connector clip 60, a fastener 76, a fastening clip 82, and a locknut 46. The fastener 76 holds the connector clip 60 together with the body 12, the connector clip 60 keeps the conduit 22 and/or cable 24 in place within the body 12, and the fastening clip 82 keeps the fastener 76 together with the connector clip 60.

The body 12 includes a body outer surface 18 extending between a body first axial end 14 and a body second axial end 16. The internal passage 20 of the body 12, which has a central passage axis, extends between the body first axial end 14 and the body second axial end 16. A body first region 28 (adjacent to the body first axial end 14) includes a first slot 30 and a second slot 32, each of which may have an elongated shape. The body 12 may further include a body second region 42 (adjacent to the body second axial end 16) that has a threaded second region outer surface 44, allowing the body second region 42 to interface with other components (such as a junction box) having threaded or grooved surfaces. For example, the locknut 46 may interface with the body second region 42 through its threaded locknut inner surface 48. The body 12 may furthermore include a body middle region 50 with an outer surface that is irregular to enhance gripping. By gripping the body middle region 50, a user may more easily rotate the body 12 in order to thread the body second region 42 into various components.

The first slot 30 has a first slot depth extending in a radial direction with respect to the central axis of internal passage 20 between the body outer surface 18 and the internal passage 20. The first slot 30 also has a first slot length extending circumferentially along the body outer surface 18 between opposing first slot sides 34 and 36, with the opposing first slot sides 34 and 36 preferably being substantially parallel with each other. The second slot 32 is distanced along the length of the body 12 away from the first slot 30. The second slot 32 has a second slot depth extending in a radial direction with respect to the central axis of the internal passage 20 between the body outer surface 18 and the internal passage 20. The second slot 32 also has a second slot length extending circumferentially along the body outer surface 18 between opposing second slot sides 38 and 40, with the opposing second slot sides 38 and 40 preferably being substantially parallel with each other. The first slot 30 may be aligned along an axis that is substantially parallel with an axis along which the second slot 32 is aligned. The axes along which the first and second slots 30 and 32 are aligned may be substantially perpendicular to the central passage axis.

The body first region 28 includes a body aperture region 52 between the first slot 30 and the second slot 32. The body aperture region 52 includes a body fastener aperture 58 that is sized to fit the fastener 76. The body fastener aperture 58 has a depth extending from the body outer surface 18 to the internal passage 20, allowing a fastener body 80 of the fastener 76 to extend into the internal passage 20. The body aperture region 52 may extend out in a radial direction with respect to the central passage axis, giving the body aperture region 52 a "hump" or "bulged" structure. The body aperture region 52 may also include an annular aperture flange 54 having a threaded flange inner surface 56. The flange inner surface 56 defines the body fastener aperture 58. The aperture flange 54 may protrude out from the body aperture region 52 in a radial direction with respect to the central passage axis.

The connector clip 60 (with which the body 12 interfaces) includes a clip body 62, with a clip first tooth 66 and a clip second tooth 68 extending from the clip body 62. The clip body 62 includes a clip fastener aperture 64 that extends through the clip body 62. The clip first tooth 66 and the clip second tooth 68 preferably include a clip first engaging end 70 and a clip second engaging end 72, respectively. The clip body 62 may be aligned with an axis that is perpendicular to both the clip first tooth 66 and the clip second tooth 68, and the clip first tooth 66 may be aligned with an axis that is parallel to an axis with which the clip second tooth 68 is aligned. The clip first tooth 66, the clip second tooth 68, and the clip body 62 may thereby form a "U" shape.

The clip first tooth 66 is sized for substantially complementary insertion through the first slot 30, and the clip second tooth 68 is sized for substantially complementary insertion through the second slot 32. As shown in FIG. 2, when such insertion is performed, the clip fastener aperture 64 is positioned over the body fastener aperture 58. The clip first tooth 66 and the clip second tooth 68 extend through the first slot 30 and the second slot 32, respectively, and into the internal passage 20. The clip first and second engaging ends 70 and 72 each engage the conduit 22 or cable 24 that is inserted through the internal passage 20 of the body 12.

The clip first engaging end 70 and the clip second engaging end 72 may be depressed toward the clip body 62 to be shaped to complementarily fit about the outer surface of the conduit 22 or cable 24 that is inserted through the internal passage 20.

The conduit 22 or cable 24 inserted through the body 12 preferably includes conduit grooves 74, and one or both of the clip first engaging end 70 and the clip second engaging end 72 may be urged within the conduit grooves 74, securing the conduit 22 within the internal passage 20 of the body 12 (see FIG. 2).

The fastener 76, which may be a screw, may include a fastener head 78 and a fastener body 80. The fastener body 80 of the fastener 76 may have an outer surface that is threaded so that it may screw into the body fastener aperture 58. As shown in FIG. 2, the fastener 76 is inserted through the clip fastener aperture 64 and the body fastener aperture 58, with its head 78 positioned on one side of the clip body 62 and its fastener body 80 positioned on an opposing side of the clip body 62. The length of the fastener body 80 of the fastener 76 may be set such that the fastener 76 does not extend into the internal passage 20 beyond the depths of the first and second slots 30 and 32.

The fastening clip 82 engages with the fastener body 80 to prevent the fastener body 80 from withdrawing from the clip fastener aperture 64 and maintaining the fastener 76 together with the connector clip 60. The fastening clip 82 is engaged to the fastener body 80 of the fastener 76 on the side of the clip body 62 opposite the fastener head 78. The fastening clip 82 fits into the threads of the outer surface of the fastener body 80, wrapping at least partially around the fastener body 80 (see FIG. 2). The fastening clip 82 may be shaped as an open wire loop with a circumferential gap 86 (labeled in FIG. 2) between a first circumferential end 88 and a second circumferential end 90. The fastening clip 82 preferably sandwiches clip body 62 against the fastener head 78, thereby helping to prevent the connector clip 60 from falling through the first and second slots 30 and 32 of the body 12 as the fastener 76 is withdrawn from the body aperture region 52. Because of the fastening clip 82, the connector clip 60 rises with the fastener 76 as the fastener 76 is withdrawn from the fastener aperture 58. As the connector clip 60 rises, the clip first tooth 66 and second tooth 68 withdraw from the internal passage 20. The fastening clip 82 thus keeps the user from having to hold onto the connector clip 60 while assembling and disassembling the connector assembly 10. For example, the user does not have to hold onto the connector clip 60 with one hand while inserting the cable 24 through the internal passage 20 with another hand.

The connector assembly 10 provides significant advantages, as further discussed below. For example, the orientation and shape of the first and second slots 30 and 32 permit the engaging ends 70 and 72 of the clip first tooth 66 and second tooth 68, respectively, to complementarily interfit with conduit grooves 74, effectively securing the conduit 22 to the body 12. The body aperture region 52 allows the fastener body 80 to extend into the internal passage 20 without obstructing the conduit 22 and cable 24. The aperture flange 54 provides more surface for engagement with the fastener body 80 as the fastener 76 enters the body fastener aperture 58. The fastening clip 82 makes the assembly, disassembly, and general use of the connector assembly 10 easier and more convenient. The connector assembly 10 may also be modified in various ways to make it highly versatile for various uses and settings, as discussed below.

Further advantages and features of the invention will be apparent from the remainder of this document in conjunction with the associated drawings.

DETAILED DESCRIPTION OF PREFERRED VERSIONS OF THE INVENTION

Figure 1:
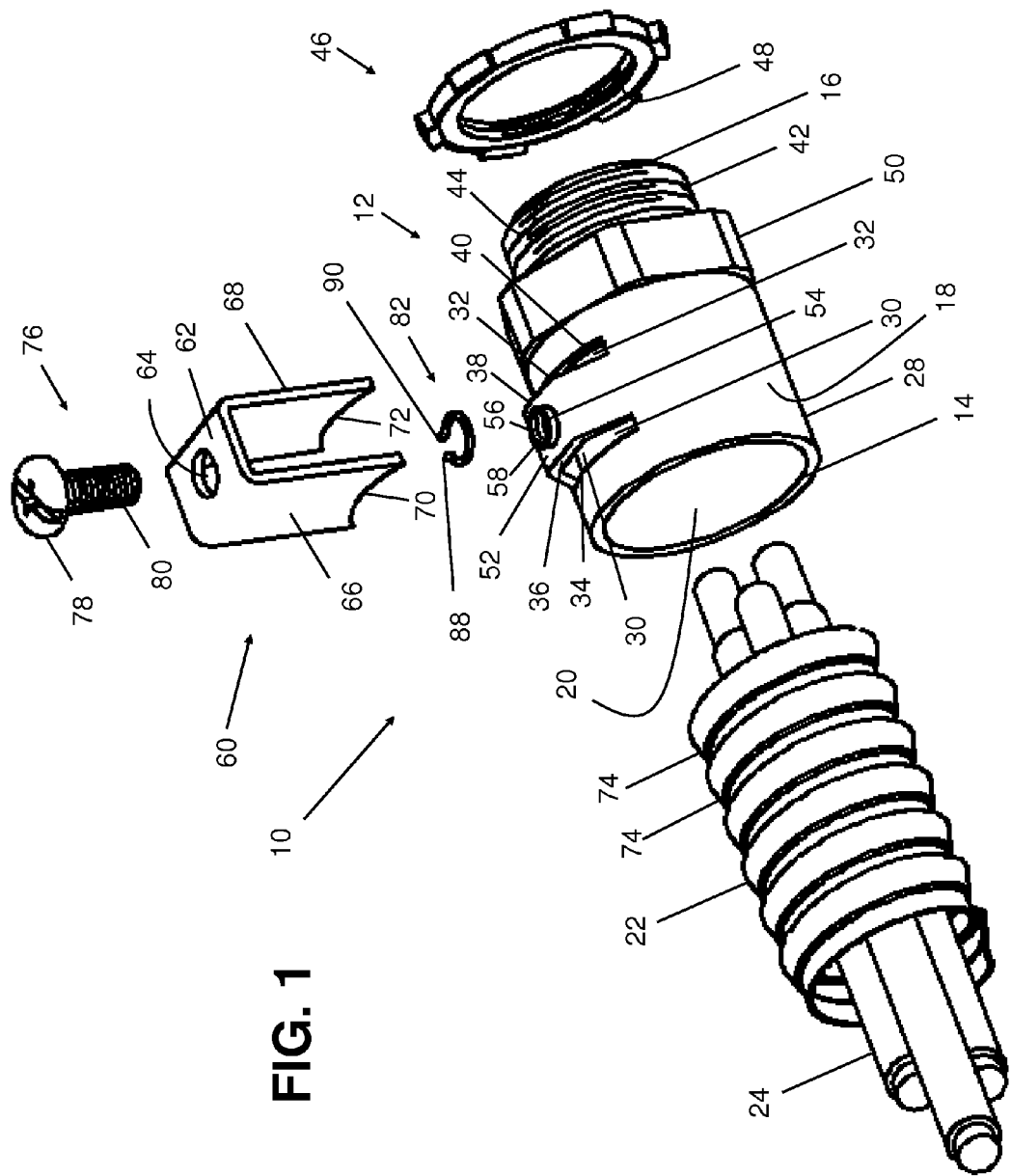
FIG. 1 is an exploded perspective view of an exemplary connector assembly.
Figure 2:
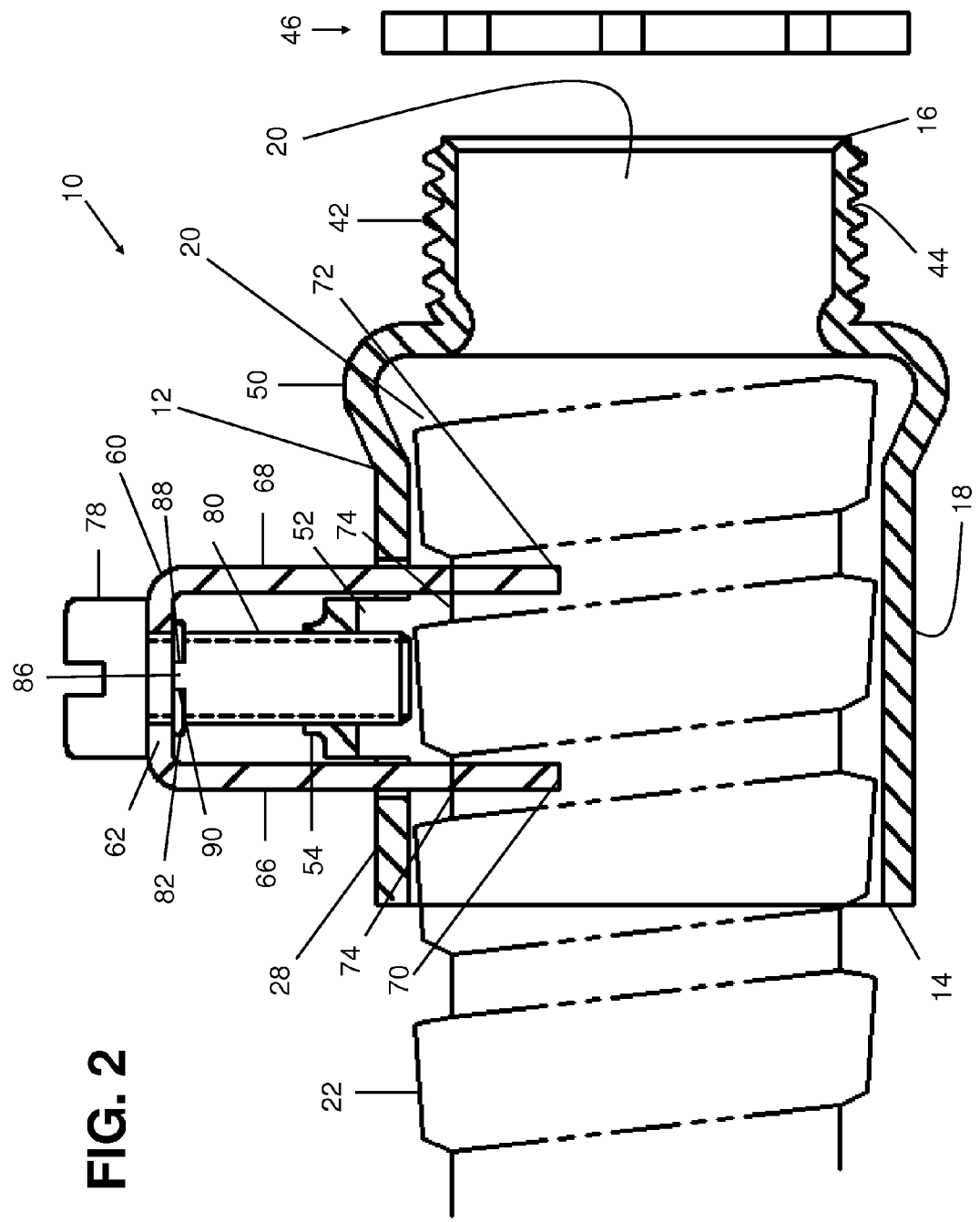
FIG. 2 is a side cut-away view of the assembled connector assembly of FIG. 1.

Continuing the discussion of the Summary section above, FIG. 2 depicts a cut-away side view of the exemplary connector assembly 10 of FIG. 1. The elongated body 12 is shown with the conduit 22 inserted through the internal passage 20. The inner diameter of the body first region 28 and the outer diameter of the conduit 22 are greater than the inner diameter of the body second region 42. This provides a barrier to the further insertion of the conduit 22 into the body second region 42, but allows the cable 24 within the conduit 22 to extend into the body second region 42 (not shown). Also, the diameters of the body first region 28, the body middle region 50, the body second region 42, and the conduit 22 can be adjusted as desired. Moreover, the diameters of the components need not be changed in stepwise fashion, and may increase or decrease gradually along the length of the body 12.

The conduit 22 is threaded, with conduit grooves 74 along its length, allowing the conduit 22 to be secured to the body 12 using the particular conduit grooves 74 that position the conduit 22 as desired through the internal passage 20. Because the conduit 22 is threaded, the conduit 22 may enter or exit through the internal passage 20 by being screwed in and out, although this is not standard practice. It is noted that the clip first and second engaging ends 70 and 72 that are shaped to be complementarily interfittable with the grooves 74 may be different from each other. Also, the conduit grooves 74 along the length of the conduit 22 need not be identical to each other.

The fastening clip 82 is preferably made of a resiliently flexible material, such as a spring steel. The body 12 may be made from sheet metal that is rolled and welded. However, it is preferably die cast or made by deforming a standard pipe using a press or stamp.

Various preferred versions of the invention are described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although the body 12 and conduit 22 are shown to be substantially cylindrical, the components of the connector assembly 10 need not be cylindrical. For example, the body 12 and the conduit 22 may be multisided, with three or more sides around their perimeters. A multisided body 12 could provide one or more slots 30 and 32 confined to a single side or spanning two or more sides. A multisided conduit 22 may include one or more conduit grooves 74 confined to a single side or spanning two or more sides. The clip first tooth 66 and the clip second tooth 68 of the connector clip 60 would be shaped to complementarily interfit into the first and second slots 30 and 32, respectively, of such a multisided body 12. Additionally, the first and second engaging ends 70 and 72 of the clip first tooth 66 and clip second tooth 68 of the connector clip 60 would be interfittable with the conduit grooves 74 of the multisided conduit 22.

Second, the fastening clip 82 shown in FIGS. 1 and 2 is an open-loop wire that wraps around part of the fastener body 80 of the fastener 76. The fastening clip 82, however, can have any structure or design that keeps the fastener 76 from withdrawing from the clip fastener aperture 64. For example, the fastening clip 82 may be an O-ring that does not permit the fastener body 80 of the fastener 76 to exit through the clip fastener aperture 64.

Third, the first and second slots 30 and 32 need not be elongated, and may instead have any geometric or non-geometric shape, including oval, serpentine, and zigzag.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A connector assembly,
   a) the connector assembly including an elongated body extending between a body first axial end and a body second axial end, the body including:
      1) a body outer surface extending between the body first axial end and the body second axial end;
      2) an internal passage into which a conduit may be inserted, the internal passage having a central passage axis and extending between the body first axial end and the body second axial end;
      3) a body first region including:
         (i) a first slot having:
            (a) a first slot depth extending between the body outer surface and the internal passage; and
            (b) a first slot length extending along the outer body surface between opposing first slot sides, the opposing first slot sides being at least substantially parallel; and
         (ii) a second slot distanced along a length of the body a slot distance away from the first slot, the second slot having:
            (a) a second slot depth extending between the body outer surface and the internal passage; and
            (b) a second slot length extending along the body outer surface between opposing second slot sides, the opposing second slot sides being at least substantially parallel;
         (iii) a body aperture region radially extending out from the central passage axis, the body aperture region:
            (a) being positioned between the first slot and the second slot;
            (b) having a body fastener aperture extending between the body outer surface and the internal passage,
   b) wherein:
      1) the first slot is at least substantially parallel to the second slot, and
      2) the first slot and the second slot are at least substantially perpendicular to the central passage axis.

2. The connector assembly of claim 1 further including a connector clip, the connector clip having:
   a) a clip body having a clip fastener aperture positioned over the body fastener aperture;
   b) a clip first tooth extending from the clip body, the clip first tooth:
      1) sized for at least substantially complementary insertion within the first slot; and
      2) inserted through the first slot to extend into the internal passage; and
   c) a clip second tooth extending from the clip body, the clip second tooth:
      1) sized for at least substantially complementary insertion within the second slot; and
      2) inserted through the second slot to extend into the internal passage.

3. The connector assembly of claim 2, wherein:
   a) the clip first tooth is positioned the slot distance away from the clip second tooth, and
   b) the clip first tooth is at least substantially parallel to the clip second tooth.

4. The connector assembly of claim 3, wherein:
   a) the connector assembly further includes a fastener,
   b) the fastener is inserted through the clip fastener aperture and the body fastener aperture, and
   c) the fastener secures the connector clip to the body.

5. The connector assembly of claim 4 further including a fastening clip secured to the fastener, wherein the fastening clip secures the fastener to the connector clip.

6. The connector assembly of claim 2 further including a conduit inserted through the internal passage of the body, wherein:
   a) the conduit includes a conduit groove,
   b) the clip first tooth includes a clip first engaging end,
   c) the clip second tooth includes a clip second engaging end,
   d) the clip first engaging end and the clip second engaging end are complementarily interfittable with the conduit groove, and
   e) the conduit is secured to the body by the engagement of the clip first engaging end and the clip second engaging end with the conduit groove.

7. The connector assembly of claim 2, wherein:
   a) the connector assembly further includes:
      1) a conduit; and
      2) a fastener having a fastener body extending from a head;
   b) the fastener body of the fastener is inserted through the body fastener aperture and the clip fastener aperture, and
   c) the fastener body of the fastener has a fastener length such that the fastener does not extend beyond the first slot depth and the second slot depth.

8. The connector assembly of claim 2, wherein:
   a) the clip first tooth includes a clip first engaging end,
   b) the clip second tooth includes a clip second engaging end,
   c) the clip first engaging end and the clip second engaging end are substantially identically depressed toward the clip body.

9. The connector assembly of claim 1 wherein the body aperture region radially bulges outwardly from the central passage axis relative to the first and second slots.

10. A connector assembly,
    a) the connector assembly including:
       1) an elongated body extending between a body first axial end and a body second axial end, the body including:
          (i) a body outer surface extending between the body first axial end and the body second axial end;
          (ii) an internal passage into which a conduit may be inserted, the internal passage having a central passage axis and extending between the body first axial end and the body second axial end;
          (iii) a body aperture region having a body fastener aperture, the body fastener aperture having a body aperture depth extending from the body outer surface to the internal passage;

(iv) a first slot having:
  (a) a first slot depth extending between the body outer surface and the internal passage; and
  (b) a first slot length extending along the outer body surface between opposing first slot sides; and
2) a connector clip including:
  (i) a clip body having a clip fastener aperture, the clip fastener aperture being positioned over the body fastener aperture; and
  (ii) a clip first tooth extending from the clip body, the clip first tooth:
    (a) sized for at least substantially complementary insertion within the first slot; and
    (b) inserted through the first slot to extend into the internal passage;
3) a fastener inserted through the body fastener aperture and the clip fastener aperture; and
4) a fastening clip secured to the fastener;
b) wherein the fastener secures the connector clip to the body, and the fastening clip secures the fastener to the connector clip.

11. The connector assembly of claim 10, wherein:
a) the connector assembly further includes a conduit,
b) the fastener includes a fastener head and a fastener body, and
c) the fastener head is positioned on one side of the clip body and the fastener body is positioned on an opposing side of the clip body.

12. The connector assembly of claim 11, wherein the fastening clip is immovably engaged with the fastener body.

13. The connector assembly of claim 12, wherein:
a) the fastener body of the fastener includes a fastener groove,
b) the fastening clip includes an open wire loop having a circumferential gap between a first circumferential end and a second circumferential end, and
c) the open wire loop is at least partly positioned within the fastener groove.

14. The connector assembly of claim 10, wherein the body aperture region radially bulges outward from the body.

15. The connector assembly of claim 10, wherein:
a) the body aperture region further includes an aperture flange radially bulging outward from the body aperture region, the aperture flange having a flange inner surface that is threaded,
b) the fastener body includes a fastener body outer surface that is threaded, and
c) the fastener body screws through the aperture flange of the body aperture region.

16. The connector assembly of claim 10, wherein the first slot length is oriented at least substantially perpendicular to the central passage axis.

17. The connector assembly of claim 10, wherein the body further includes a second axial end region having a second region outer surface that is threaded.

18. The connector assembly of claim 10, wherein:
a) the body further includes a second slot having:
  1) a second slot depth extending between the body outer surface and the internal passage; and
  2) a second slot length extending along the body outer surface between opposing second slot sides;
b) the connector clip further includes a clip second tooth extending from the clip body, the clip second tooth:
  1) sized for at least substantially complementary insertion within the second slot; and
  2) inserted through the second slot to extend into the internal passage.

19. A connector assembly,
a) the connector assembly including:
  1) an elongated body extending between a body first axial end and a body second axial end, the body including:
    (i) a body outer surface extending between the body first axial end and the body second axial end;
    (ii) an internal passage into which a conduit may be inserted, the internal passage having a central passage axis and extending between the body first axial end and the body second axial end;
    (iii) a body first region including:
      (a) a body aperture region having a body fastener aperture, the body fastener aperture having a body fastener aperture depth extending from the body outer surface to the internal passage;
      (b) an elongated first slot having:
        i) a first slot depth extending between the body outer surface and the internal passage; and
        ii) a first slot length extending along the outer body surface between opposing first slot sides;
      (c) an elongated second slot that is at least substantially parallel to the first slot, the second slot having:
        i) a second slot depth extending between the body outer surface and the internal passage;
        ii) a second slot length extending along the body outer surface between opposing second slot sides; and
    (iv) a body second region having a second region outer surface that is threaded;
  2) a connector clip including:
    (i) a clip body having a clip fastener aperture, the clip fastener aperture positioned over the body fastener aperture;
    (ii) a clip first tooth extending from the clip body, wherein the clip first tooth is:
      (a) sized for at least substantially complementary insertion within the first slot; and
      (b) inserted through the first slot to extend into the internal passage;
    (iii) a clip second tooth extending from the clip body, wherein the clip second tooth is:
      (a) at least substantially parallel to the clip first tooth;
      (b) sized for at least substantially complementary insertion within the second slot; and
      (c) inserted through the second slot to extend into the internal passage;
  3) a fastener inserted through the body fastener aperture and the clip fastener aperture; and
  4) a fastening clip secured to the fastener;
b) wherein:
  1) the first slot and the second slot are at least substantially perpendicular to the central passage axis,
  2) the body aperture region is positioned between the first slot and the second slot, and
  3) the fastener secures the connector clip to the body, and the fastening clip secures the fastener to the connector clip.

20. The connector assembly of claim 19, wherein:
a) the fastener further includes a head and a fastener body extending from the head,
b) the head is positioned on one side of the clip body and the fastener body is inserted through the clip fastener aperture to extend to an opposing side of the clip body, and
c) the fastening clip is immovably engaged with the fastener body of the fastener.

21. The connector assembly of claim 19, wherein the body aperture region further includes a body aperture flange that radially bulges outward from the body aperture region, the aperture flange having a flange inner surface that is threaded.

\* \* \* \* \*